(12) United States Patent
Dani et al.

(10) Patent No.: US 9,330,148 B2
(45) Date of Patent: May 3, 2016

(54) ADAPTING DATA QUALITY RULES BASED UPON USER APPLICATION REQUIREMENTS

(75) Inventors: Mohan N. Dani, Chamarajpet Bangalore (IN); Anuj Gupta, New Delhi (IN); Mukesh K. Mohania, Agra (IN); Girish Venkatachaliah, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 13/173,371

(22) Filed: Jun. 30, 2011

(65) Prior Publication Data
US 2013/0007629 A1 Jan. 3, 2013

(51) Int. Cl.
*G06F 17/30* (2006.01)

(52) U.S. Cl.
CPC .................................. *G06F 17/3056* (2013.01)

(58) Field of Classification Search
CPC .................................. G06F 17/30; G06F 17/00
See application file for complete search history.

(56) References Cited

U.S. PATENT DOCUMENTS

| | | | |
|---|---|---|---|
| 4,542,509 A | 9/1985 | Buchanan et al. | |
| 4,849,905 A | 7/1989 | Loeb et al. | |
| 5,179,633 A | 1/1993 | Barabash et al. | |
| 5,305,448 A | 4/1994 | Insalaco et al. | |
| 5,319,556 A * | 6/1994 | Bessacini ........................ | 701/21 |
| 5,320,142 A * | 6/1994 | Sainen ........................ | 139/435.2 |
| 5,353,401 A * | 10/1994 | Iizawa et al. .................. | 715/763 |
| 5,361,370 A | 11/1994 | Sprague et al. | |
| 5,377,354 A | 12/1994 | Scannell et al. | |
| 5,386,392 A | 1/1995 | Cantiant et al. | |
| 5,390,286 A | 2/1995 | Ramakrishna | |
| 5,423,038 A | 6/1995 | Davis | |
| 5,426,727 A * | 6/1995 | Sugiura et al. ................ | 345/467 |
| 5,428,377 A * | 6/1995 | Stoffel et al. .................... | 347/15 |
| 5,430,854 A | 7/1995 | Sprague et al. | |
| 5,442,641 A | 8/1995 | Beranger et al. | |
| 5,452,101 A | 9/1995 | Keith | |

(Continued)

FOREIGN PATENT DOCUMENTS

| | | |
|---|---|---|
| CN | 1549162 A | 11/2004 |
| CN | 1695152 | 11/2005 |

(Continued)

OTHER PUBLICATIONS

Spriestersbach, Axel, and Thomas Springer. "Quality attributes in mobile web application development." In Product Focused Software Process Improvement, pp. 120-130. Springer Berlin Heidelberg, 2004.*

(Continued)

*Primary Examiner* — Farhan Syed
(74) *Attorney, Agent, or Firm* — Susan Murray; Edell, Shapiro & Finnan, LLC

(57) ABSTRACT

During application of data quality rules to a data set obtained from a data source, data is retrieved from the data source along with a common set of rules configured to format the retrieved data in a manner in accordance with one or more predefined data quality rules of the common set of rules. At least one predefined data quality rule is adjusted utilizing at least one editable widget to form a modified set of data quality rules adapted for use with a specified application. The modified set of data quality rules is applied to the retrieved data.

9 Claims, 6 Drawing Sheets

(56) References Cited

U.S. PATENT DOCUMENTS

| | | | |
|---|---|---|---|
| 5,485,618 A | 1/1996 | Smith | |
| 5,495,567 A * | 2/1996 | Iizawa et al. | 715/762 |
| 5,505,843 A * | 4/1996 | Obuchi et al. | 210/94 |
| 5,517,665 A | 5/1996 | Sprague et al. | |
| 5,522,080 A | 5/1996 | Harney | |
| 5,530,884 A | 6/1996 | Sprague et al. | |
| 5,548,793 A | 8/1996 | Sprague et al. | |
| 5,557,619 A | 9/1996 | Rapoport | |
| 5,607,097 A * | 3/1997 | Sato et al. | 228/8 |
| 5,619,619 A | 4/1997 | Shinohara et al. | |
| 5,684,478 A | 11/1997 | Panaoussis | |
| 5,684,969 A | 11/1997 | Ishida | |
| 5,712,978 A * | 1/1998 | Lerner et al. | 709/224 |
| 5,751,704 A | 5/1998 | Kostic et al. | |
| 5,778,370 A | 7/1998 | Emerson | |
| 5,850,343 A * | 12/1998 | Nakamura | 700/174 |
| 6,031,990 A * | 2/2000 | Sivakumar et al. | 717/124 |
| 6,061,724 A * | 5/2000 | Ries et al. | 709/224 |
| 6,088,706 A | 7/2000 | Hild | |
| 6,115,693 A * | 9/2000 | McDonough et al. | 705/7.16 |
| 6,138,123 A | 10/2000 | Rathbun | |
| 6,208,941 B1 * | 3/2001 | Marks | 702/20 |
| 6,219,829 B1 | 4/2001 | Sivakumar et al. | 717/131 |
| 6,542,180 B1 * | 4/2003 | Wasserman et al. | 348/131 |
| 6,920,474 B2 * | 7/2005 | Walsh | G06Q 10/063 705/7.11 |
| 7,219,327 B1 * | 5/2007 | Jacobs | G06F 8/10 717/104 |
| 7,246,144 B2 * | 7/2007 | Walsh | G06Q 10/06 705/7.27 |
| 7,308,674 B2 * | 12/2007 | Fairweather | 717/103 |
| 7,320,016 B2 * | 1/2008 | Walsh | G06Q 10/063 709/200 |
| 7,505,868 B1 * | 3/2009 | Shan | G06F 11/0727 702/182 |
| 7,565,359 B2 * | 7/2009 | Nazem | G06F 17/2288 |
| 8,566,397 B2 * | 10/2013 | Richards | G06F 9/541 705/1.1 |
| 8,566,732 B2 * | 10/2013 | Louch | G06F 3/04817 715/764 |
| 8,626,618 B2 * | 1/2014 | Psota | G06Q 30/02 705/26.9 |
| 8,924,928 B1 * | 12/2014 | Belovich | H04L 63/101 706/45 |
| 2003/0061242 A1 * | 3/2003 | Warmer | G06F 17/30707 |
| 2003/0233249 A1 * | 12/2003 | Walsh | G06Q 10/063 709/203 |
| 2004/0083199 A1 | 4/2004 | Govindugari et al. | |
| 2005/0114201 A1 * | 5/2005 | Walsh | G06Q 10/06 709/200 |
| 2005/0197880 A1 * | 9/2005 | Walsh | G06Q 10/063 709/200 |
| 2006/0020641 A1 * | 1/2006 | Walsh | G06Q 10/10 |
| 2007/0026426 A1 | 2/2007 | Fuernkranz et al. | |
| 2007/0130541 A1 * | 6/2007 | Louch | G06F 3/04817 715/804 |
| 2008/0077945 A1 * | 3/2008 | Sethuraman | 719/329 |
| 2008/0214152 A1 * | 9/2008 | Ramer | G06F 17/30749 455/414.1 |
| 2008/0301016 A1 * | 12/2008 | Durvasula | G06Q 30/02 705/35 |
| 2009/0024584 A1 * | 1/2009 | Dharap | G06F 15/177 |
| 2009/0094223 A1 * | 4/2009 | Berk et al. | 707/5 |
| 2009/0222348 A1 * | 9/2009 | Ransom et al. | 705/14 |
| 2009/0234826 A1 | 9/2009 | Bidlack | |
| 2010/0005346 A1 | 1/2010 | Hamlescher et al. | |
| 2010/0153865 A1 * | 6/2010 | Barnes et al. | 715/762 |
| 2010/0159967 A1 * | 6/2010 | Pounds et al. | 455/466 |
| 2010/0274815 A1 * | 10/2010 | Vanasco | 707/798 |
| 2011/0070587 A1 * | 3/2011 | Fuernkranz | G06F 19/28 435/5 |
| 2012/0084357 A1 * | 4/2012 | Richards | G06F 9/541 709/204 |
| 2012/0102530 A1 * | 4/2012 | Quan | 725/50 |
| 2012/0110027 A1 | 5/2012 | Falcon | |
| 2012/0166412 A1 * | 6/2012 | Sengamedu | G06F 17/30867 707/709 |
| 2012/0203708 A1 * | 8/2012 | Psota | G06Q 30/02 705/347 |
| 2013/0006992 A1 * | 1/2013 | Dani | G06F 17/3056 707/737 |
| 2014/0156513 A1 * | 6/2014 | Psota | G06Q 30/02 705/39 |
| 2014/0258032 A1 * | 9/2014 | Psota | G06Q 30/02 705/26.35 |

FOREIGN PATENT DOCUMENTS

| | | |
|---|---|---|
| CN | 101930370 | 12/2010 |
| EP | 1566758 A1 | 8/2005 |

OTHER PUBLICATIONS

Bernhard Schandl, Dissertation, "An Infrastructure for the Development of Semantic Desktop Applications", Aug. 2009, (199 pages).
"The Pillars of Master Data Management", Data Profiling, Data Integration and Data Quality, Business Intelligence Network™ Research Report, Prepared for Initiate Systems, May 2007 Powell Media, LLC and David Loshin (28 pages).
Chiang et al., "Discovering Data Quality Rules", PVLDB '08, Aug. 23-28, 2008, Auckland, New Zealand Copyright 2008 VLDB Endowment, ACM 978-1-60558-305—Jan. 8, 2008, (pp. 1166-1177).
Victor López-Jaquero et al., "Towards an Extended Model of User Interface Adaptation: the ISATINE framework", Laboratory on User Interaction & Software Engineering (LoUISE) Universidad de Castilla-La Mancha, 02071 Albacete, Spain (19 pages).
Trillium Software System®, Enterprise Services Edition Product Overview, Harte-Hanks Trillium Software, (21 pages).
Laure Berti-Équille, IRISA, "Quality-Adaptive Query Processing Over Distributed Sources", U. of Rennes I, France, (13 pages).
Leo L. Pipino, "Data Quality Assessment", Communications of the ACM Apr. 2002/vol. 45, No. 4ve, (pp. 211-218).
Victor López-Jaquero et al., "Towards an Extended Model of User Interface Adaptation: the ISATINE framework", Laboratory on User Interaction & Software Engineering (LoUISE) Universidad de Castilla-La Mancha, 02071 Albacete, Spain, 2008 (19 pages).
Trillium Software System®, Enterprise Services Edition Product Overview, Harte-Hanks Trillium Software, 2009 (21 pages).
Laure Berti-Équille, IRISA, "Quality-Adaptive Query Processing Over Distributed Sources", U. of Rennes I, France, Ninth International Conference on Information Quality (IQ 2004), Nov. 5-7, 2004, (13 pages).
Chiang et al., "Discovering Data Quality Rules," PVLDB '08, Aug. 23-28, 2008, ACM, Auckland, New Zealand, pp. 1166-1177.
Agrawal, Himanshu et al.: "An Enhanced Extract-Transform-Load System for Migrating Data in Telecom Billing". IEEE 2008, 978-1-4244-1837—Apr. 2008; pp. 1277-1286.
German Office Action dated Jun. 13, 2013, 6 pages.
Chinese Office Action dated Nov. 18, 2014, 7 pages.

* cited by examiner

| RULE BROWSER | | ≡ ▽ |
|---|---|---|
| ▲ EXACT TEXT RULE | | NEW TEXT RULE... |
| ▼ PATTERN RULE | | ADD PATTERN... |
| RULE | | FREQUENCY |
| ▼ ☐ >B++C | | 27% |
| ◆ IGNORE BUSINESS SUFFIX | | 15% |
| - 12OZ FIZZY CORP CHEESE CAN | | |
| - 500G VALHALLA INC CHEESE WRAPPER | | |
| - 1KG PARETTO PEPPERONI SLICES BAG | | |
| - 5OZ VALHALLA MOZARELLA CHEESE WRAP | | |
| - 6OZ SWIRLY VANILLA PUDDING CUP | | |
| - 12OZ FIZZY SPRAY CHEESE CAN | | |
| - 14OZ AURORA CHOCOLATE CRUNCH BOX | | |
| - CHIPS 8OZ BAG TWISTERS | | |
| - CRACKERS 16 OZ BOX TWISTERS | | |
| - MOZZARELLA 15OZ WRAPPER VALHALLA | | |
| - PRETZELS 16OZ BAG TWISTERS | | |
| - SAUSAGE 500G WRAPPER PARETO | | |
| ◆ DATA ONLY MATCHES PATTERN | | 10% |
| ◆ ☐ TEST EMPTY RULE | | 0% |
| ▲ ☐ UNHANDLED RECORDS | | 2% |
| ▲ ☐ >CB++ | | 4% |
| ▲ ☐ +>CB | | 3% |
| ▲ ☐ >B+++C | | 3% |
| ▲ ☐ ^MCB+ | | 3% |
| ▲ ☐ ++BB | | 3% |
| ▲ ☐ ++CC | | 3% |
| ▲ ☐ +++ | | 2% |
| ▲ ☐ ++ | | 1% |
| 50000 EXAMPLE RECORDS (71% HANDLED) | 9 PATTERNS | |

PRODUCT ENTITY WIDGET  [EDIT RULES]

PRODUCT NAME

BRAND NAME

QUANTITY

TYPE

DATA ⇅ RULES

GROCERY DATA DETAILS (DISPLAYING 300 OF 1000- RECORDS)
- 32 SLCS VALHALLA CHEESE WRAPPER
- CHEESY POOFS BAG 16 OUNCES
- THE SPICE BOYS 5 OUNCE CHILI POWDER SHAKER
- TWO OUNCE SHAKER PAPRIKA THE SPICE BOYS
- PAPRIKA SPICE BOYS TWO OUNCE SHAKER
- THE SPICE BOYS 5 OUNCE CHILI POWDER
- THE SPICE BOYS 5 OUNCE CHILI POWDER
- TWO OUNCES GARLIC SHKR SPICE BOYS
- TWISTERS PRETZELS 1 1/2 OUNCE BAG
- RYE 24 SLICES EHF 32 OUNCES BREAD BAG
- 1 1/2 OUNZE BAG TWISTERS PRETZEL STICKS
- TWISTERS PRETZELS 1 1/2 OUNCE BAG
- RYE 24 SLICES EAST HILL FARM 32 OUNCES
- 32 OZ BAG WHITE EAST HILL FARM BREAD 24 SLCS
- 16 OZ BAG EAST HILL FARM WHITE BREAD 12 SLICES
- 1KG PARETO PEPPERONI 32 SL WRAPPER
- 24 OZ FIZZY SPRAY CHEESE TWO CANS
- 32 OZ EAST HILL FARM RYE BREAD BAG 24 SLICES
- 1KG TWO PARETO SAUSAGES WRAPPER
- 1 1/2 KILOGRAM PARETO PEPPERONI 48 SLCS WRAP
- ONE KILO PARETO PEPPERONI 32 SL WRAPPER
- 32 OZ EHF RYE BREAD BAG 24
- 500 G PARETO PEPPERONI 16 SL WRAPER
- 16 OZ BAG EHF WHITE BREAD 12 SLICES
- 24 OZ FIZZY SPRAY CHEESE 2 CANS
- THREE PARETO SAUSAGES WRAPPER 1.5 KG
- 500 G PARETO PEPPERONI 16 SL WRAPPER

PRODUCT ENTITY WIDGET | EDIT RULES

PRODUCT NAME
BRAND NAME
QUANTITY
TYPE

30

35

EDIT ACTION

CLASS: [>]  EXAMPLE RECORD: [12OZ] FIZZY CORP CHEESE CAN

1. TAKE

*OBJECT: [EVERYTHING BUT...▼]   *OBJECT: [PREFIX...▼]   EXAMPLE RESULTS: [OZ ▼]

○ ALL LEADING ALPHAS
● ALL LEADING DIGITS
○ FIRST [1] CHARACTERS

2. PERFORM OPTIONAL LOOKUP   ○ NO   ● YES

*SOURCE: [LIST...▼]   *LIST:

| VALUE | RETURN VALUE | SIMILARITY THRESHOLD |
|---|---|---|
| OZ | OUNCES | 900 (EXACT) ▶ |
| KG | KILOS | 900 (EXACT) ▶ |
| G | GRAMS | 900 (EXACT) ▶ |
|  | ENTER TEXT... | 900 (EXACT) ▶ |

IF FOUND: [CONVERT TO RETURN VALUE ▼]

IF NOT FOUND: [USE EVERYTHING BUT PREFIX ▼]

3. ADD TO

*OUTPUT COLUMN: [UNITMEASURE ▼]   LEADING SEPERATOR: [SPACE] ▼

☐ SPECIFY ACTION FOR REMAINING CHARACTERS

[OK]   [CANCEL]

ADAPTING DATA QUALITY RULES BASED UPON USER APPLICATION REQUIREMENTS

BACKGROUND

1. Technical Field

Embodiments of the invention relate to establishing rules for data quality when extracting data from one or more data sources.

2. Discussion of the Related Art

When loading data from one or more data sources into a system for use in an application, the data must typically undergo some sort of data quality analysis and/or data cleansing to ensure the data is suitable for use with the application. Data quality requirements for the same data can differ based upon a particular application which will use the data (e.g., different clients and/or different departments of a client may have different requirements for data quality). However, while certain general data quality rules can be established that ensure data is provided having a certain format, the rules are typically set and established by logic associated with the application or at a system source that extracts data from a data source. To change some or all of the data quality rules typically requires a change in an application or source system code. Because of this, data quality rules typically cannot be modified at run time, but instead need to be evaluated during a data processing cycle, with changes only being made after the processing cycle.

Since specific rules that apply to one application may differ for another application, it is difficult to ensure precise data quality for a number of applications retrieving data from one or more data sources.

BRIEF SUMMARY

In an example embodiment of the present invention, a computer-implemented method is provided for applying data quality rules to a data set obtained from at least one data source. The method comprises retrieving data from the at least one data source along with a common set of rules configured to format the retrieved data in a manner in accordance with one or more predefined data quality rules of the common set of rules, adjusting at least one predefined data quality rule utilizing at least one editable widget to form a modified set of data quality rules adapted for use with a specified application, and applying the modified set of data quality rules to the retrieved data.

In another example embodiment of the present invention, a system is provided for applying data quality rules to a data set obtained from at least one data source. The system comprises a source system to retrieve data from the at least one data source along with a common set of rules configured to format the retrieved data in a manner in accordance with one or more predefined data quality rules of the common set of rules, and a client to receive the retrieved data and common set of rules from the source system. The client includes a widget module comprising at least one editable widget and the client is further configured with logic to: adjust at least one predefined data quality rule utilizing the at least one editable widget to form a modified set of data quality rules adapted for use with a specified application of the client, and apply the modified set of data quality rules to the retrieved data.

In still another example embodiment of the present invention, a computer program product is provided for applying data quality rules to a data set obtained from at least one data source. The computer program product comprises a computer readable storage medium having computer readable program code embodied therewith. The computer readable program code configured to receive data retrieved from the at least one data source along with a common set of rules configured to format the retrieved data in a manner in accordance with one or more predefined data quality rules of the common set of rules, adjust at least one predefined data quality rule utilizing at least one editable widget to form a modified set of data quality rules adapted for use with a specified application, and apply the modified set of data quality rules to the retrieved data.

The above and still further features and advantages of embodiments of the present invention will become apparent upon consideration of the following detailed description thereof, particularly when taken in conjunction with the accompanying drawings wherein like reference numerals in the various figures are utilized to designate like components.

BRIEF DESCRIPTION OF THE SEVERAL VIEWS OF THE DRAWINGS

FIG. 4 is a schematic diagram showing application of data quality rules to a set of data for generating a widget according to an example embodiment of the present invention.

FIG. 6 depicts a GUI image associated with a widget that allows for modification/customization of data quality rules associated with the widget according to an example embodiment of the present invention.

DETAILED DESCRIPTION

Present invention embodiments provide for the application of data quality rules to a data set obtained from a data source. Data is retrieved from the data source along with a common set of rules configured to format the retrieved data in a manner in accordance with one or more predefined data quality rules of the common set of rules. At least one predefined data quality rule is adjusted utilizing at least one editable widget to form a modified set of data quality rules adapted for use with a specified application, and the modified set of data quality rules is applied to the retrieved data. The invention embodiments facilitate the modification or customization of a common set of data quality rules for each different application that may be utilized for different client systems.

Figure 1:
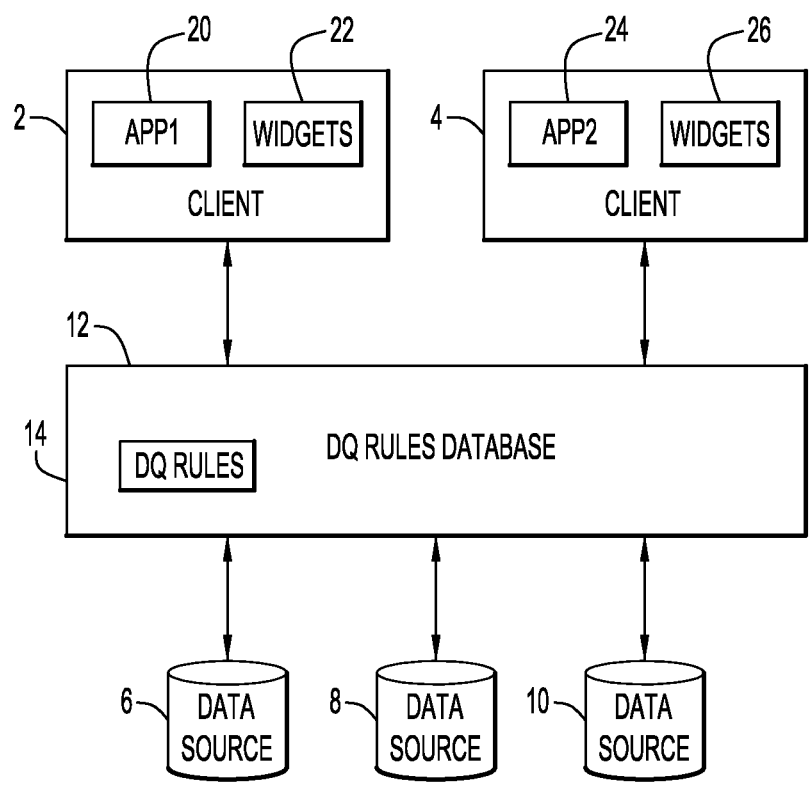
FIG. 1 is a diagrammatic illustration of an example embodiment of a system for retrieving data that implements data quality rules that are adjustable on an individual basis in accordance with the present invention.

An example embodiment of a system that implements features of the present invention is depicted in FIG. 1. The system includes a plurality of clients 2, 4 that access data from one or more data sources 6, 8, 10 through a source system, referred to in FIG. 1 as a data quality rules database 12. While only two clients 2, 4 and three data sources 6, 8, 10 are shown in FIG. 1, it is noted that this is a simple representation and the system is not limited to this number. Instead, any suitable number of clients and data sources can be provided for the system. The quality rules database 12 is configured to retrieve or extract data from the data sources 6, 8, 10 based upon a query for data from a client 2, 4 and provide the data to the client requesting such data (e.g., via any suitable extract, transfer and load process). The database 12 further includes any suitable number of different types or sets of common or generic data quality rules that apply uniform rules to the data based upon a selected rule type prior to providing the data to the client making the query. The common set of rules includes rules that are fixed and applicable to extracting and formatting data in the same manner for each client requesting such data from the data sources.

The clients 2, 4, data quality rules database 12 and data sources 6, 8, 10 may be remote from each other and communicate (as indicated by the arrows between different system components as shown in FIG. 1) via a direct connection or any suitable network. For example, a network can be implemented to facilitate transfer any types of data and/or other information between two or more system components utilizing any suitable communications media (e.g., wide area network (WAN), local area network (LAN), Internet, Intranet, etc.). Alternatively, one or more of the clients 2, 4, data quality rules database 12 and data sources 6, 8, 10 may be local to each other, and communicate via any appropriate local communication medium (e.g., local area network (LAN), hardwire, wireless link, Intranet, etc.). Further, the any two or more of the clients 2, 4, data quality rules database 12 and data sources 6, 8, 10 and migration database 4 can be implemented as sub-components within a single system component.

Each of the clients 2, 4, data quality rules database 12 and data sources 6, 8, 10 may be implemented by any conventional or other computer systems which can be equipped with a display or monitor to provide a graphical user or other interface (e.g., to provide command line prompts, widget and/or other menu screens, etc.) to solicit information from users pertaining to the desired data and analysis, a base (e.g., including the processor, memories and/or internal or external communications devices (e.g., modem, network cards, etc.)), optional input devices (e.g., a keyboard, mouse or other input device), and any commercially available and/or custom software (e.g., server/communications software, analysis and/or other types of modules, browser/interface software, etc.).

The data quality rules database includes a data quality rules module 14 from which a common set of data quality rules can be applied to data retrieved from the data sources prior to the data being provided to a client. The data quality rules module 14 can include a selected number of different sets of predefined data quality rules to apply to data based upon the requirements for a particular application and/or particular columns of data or data records that are retrieved based upon a data query. Data quality rules can be any series of logical operations to be performed on the data, such as constraints to be applied to the data or actions to be taken on the data (e.g., modifications to the data based upon a condition being met within a rule). In an example embodiment, a data string from a column of data for a record obtained from a table within a data source may include a name (e.g., business manager name, contact name, etc.) such as "MR SMITH JOHN HAROLD". A particular rule may be selected from data quality rules module 14 that separates the data from the string into different categories, such as:

(1) Title: MR
First Name: JOHN
Middle Name: HAROLD
Last Name: SMITH

In another example, a string from a column in a table of a data source may be a series of numbers, such as '1234567890123', that designates a country code, a region, a city, a data type and a data code (e.g., representing information about accounts within a particular city). A rule from the data quality rules module 14 might separate the data from the string into the following different categories for use by a particular application:

(2) Country Code (3 digits)—Region (2 digits)—City (3 digits)—Type (1 digit)—Account Code (5 digits): 132-34-567-8-9101234

The data quality rules database 12 applies one or more rules from the data quality rules module 14 to the data obtained from one or more of the data sources 6, 8, 10 and provides such data (with data strings separated into the different categories based upon the requirements of the data rules) to a client making a query. For example, client 2 includes an application App1 (20), while client 4 includes a different application App2 (24). Either client may be requesting data from one or more of the data sources 6, 8, 10 utilizing database 12. The same set of data quality rules provided in the data quality rules module 14 may be applied to the same types of data requested by each client 2, 4.

However, the application App1 (20) for client 2 may require data to be provided in formats that are slightly revised or modified from the general or common rules format applied by the data quality rules of the data quality rules module 14. In addition, the application App2 (24) for client 4 may also have format requirements that are slightly different from App1 and also that are slightly revised in relation to the common rules format applied by data quality rules of the module 14. In scenarios in which there are multiple clients and/or multiple applications that have slightly different or modified requirements for data formats to be applied to data received from data sources, it becomes a difficult task to provide a complete set of data rules that can anticipate every possible format type that may be required for an application or a user that is working with the application to process data from the data sources.

As an example scenario, consider example (1) above, in which the data rules may separate a name string such as "MR SMITH JOHN HAROLD" into a common format for use by various client applications. In this scenario, there may be a number of different client applications that require the name string to be in different formats for utilization by the application. For example, one application might require the name string to be in the following format: "Mr John Harold SMITH"; another application might require the name string to be in the following format: "John Smith"; still another application might require the name string to be in the following format: "Mr. Smith"; a further application might require the name string to be in the following format: "John H. Smith".

In another example scenario, consider example (2) above, in which the data rules may separate a number data string, such as "1234567890123", into a common format including different categories as noted in example (2). Different client applications may also require further differences in the format. For example, one application might require the string format to be Region—City—Type—Code (e.g., 34-567-8-901234), where the country code is removed; another application might require the string format to be only the code (e.g., 901234); still another application might require only the city information (e.g., 567).

The common set of data quality rules are predefined rules that are applied by a source system (such as the data quality rules database 12 in the system of FIG. 1) or utilizing the logic implemented by a client application. However, such rules cannot be easily modified or adapted without changing the source code at the source system or for the application. This can be a tedious and time consuming task anytime a modification may be desired or required for a particular client application that uses the data retrieved from the data sources.

In accordance with the invention embodiments, each client is provided with one or more graphical user interface (GUI) elements or widgets that allow a client user to fine tune or adapt the rules for the application to be used and/or based upon changing client application requirements and/or user preferences or specifications. Referring again to FIG. 1, client 2 includes a GUI widget module 22 including a plurality of widgets configured to further tailor or adapt the rules to be applied to data received from the data quality rules database 12 in accordance with client requirements for the application App1 (20). Client 4 also includes a GUI widget module 26 including a plurality of widgets that perform the same function for App2 (24).

The widgets of widget modules 22, 26 comprise GUI menus that include any suitable types of adjustable control objects including, without limitation, toggle on/off buttons, check boxes, selectable menus and/or icons, fillable fields, etc. that facilitate making manipulations or adjustments to the data received from the database 12 which further adapts the data for use with the client application based upon user specifications. Thus, the widgets allow for further editing and adaptation of the common set of rules to be applied to the data retrieved by the data sources based upon the client application and/or user requirements for a specific scenario.

As noted above, the data quality rules database 12 of the system can be configured to apply rules to data records retrieved or extracted from one or more data sources 6, 8, 10 utilizing data quality rules obtained from module 14 prior to transfer of such data to a client. It is further noted that the system can also be configured such that the data quality rules database 12 provides data records retrieved from one or more data sources along with a common set of data quality rules from module 14 to a client, where the client then applies the data quality rules as adapted by a widget for use by a client application. For example, a widget can be configured to include information associated with the data obtained from one or more data sources, including metadata, and also the common set of data quality rules associated with the data which are provided by the data quality module 14 of the database 12, such that the widget applies the rules to the data.

Figure 2:
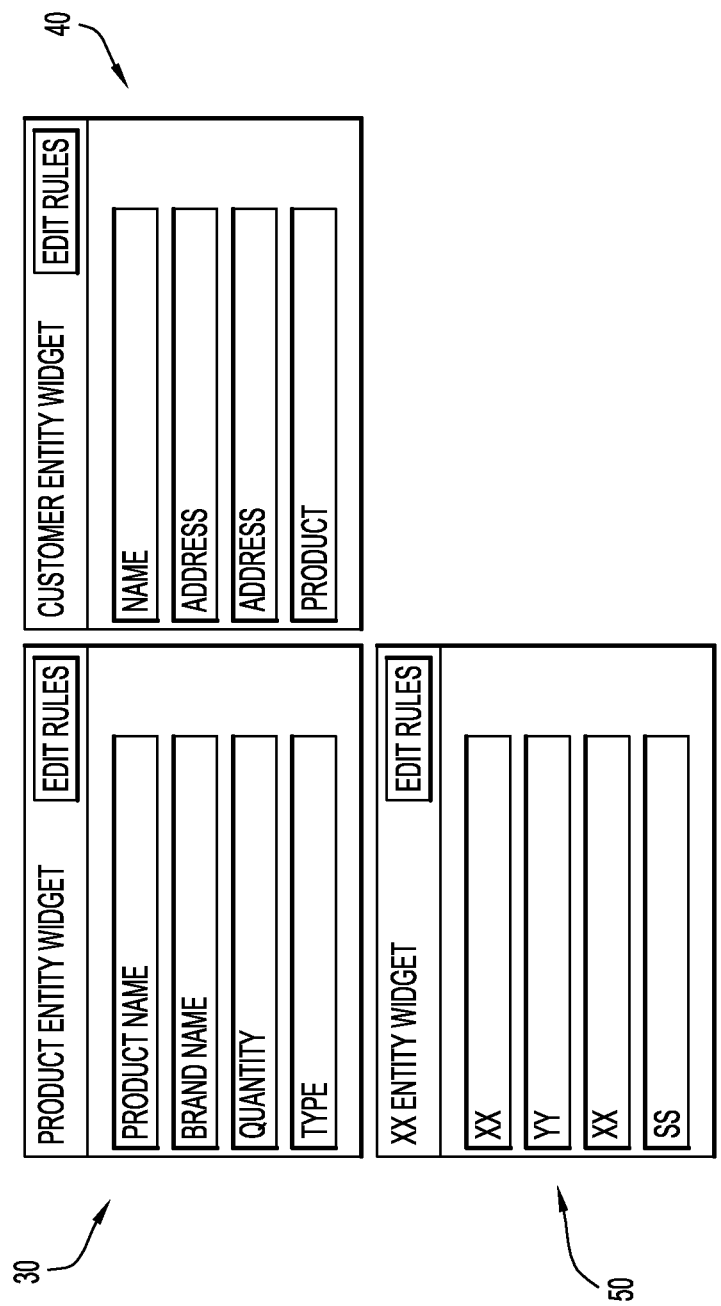
FIG. 2 depicts GUI images of example widgets for use in adapting data quality rules for a particular client application based upon application and/or user specifications.

Example embodiments of widgets that can be used to adapt a common set of rules for an application are depicted in FIG. 2. The widgets depicted in FIG. 2 are associated with data entities (where a data entity is associated with a series of records in the same entity category, e.g., products, customers, employees, etc.), and each entity widget is associated with identified columns of a data table that are of interest and include data to be formatted in a certain manner for use with a client application. For example, a Product Entity Widget 30 (which is associated with product data) and a Customer Entity Widget 40 (which is associated with customer data) are depicted in FIG. 2. Additional widgets can also be generated, where the widget has a basic template (shown as widget 50) that can be modified to include specific information about data columns associated with a particular entity. Each widget further includes an "Edit Rules" button that facilitates editing of data quality rules associated with the entity in a selective manner by a user as described below.

Figure 3:
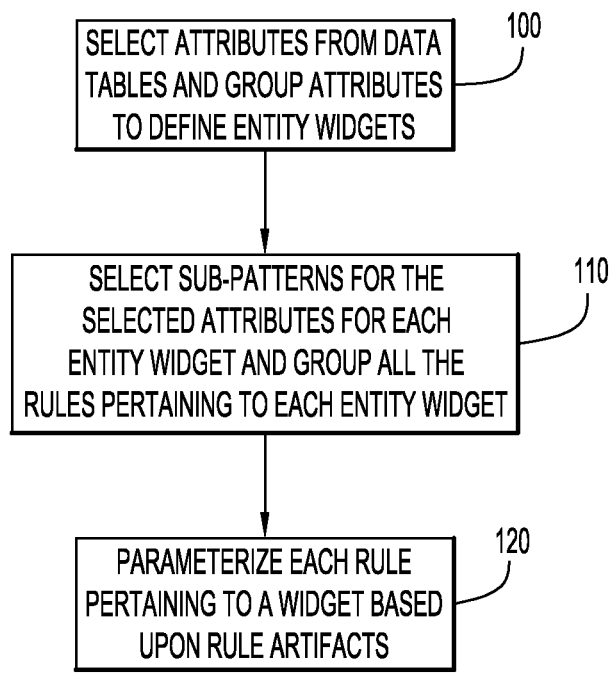
FIG. 3 is a flow diagram illustrating the manner in which a widget is generated according to an example embodiment of the present invention.

Widgets, such as widgets 30-50 shown in FIG. 2, can be generated according to a process as shown in the flowchart of FIG. 3. In particular, entity widgets are initially defined by selecting attributes (e.g., columns) from data tables of the data obtained from a data source (step 100). For example, referring to Product Entity Widget 30, the attributes that are associated with this widget are product name, brand name, quantity and type. For the Customer Entity Widget 40, the attributes associated with this widget are name, address1 (first address box), address2 (second address box), and product. Patterns corresponding to the selected data attributes are then selected for an entity widget, and all the rules pertaining to the entity widget are grouped with that widget (step 110). The patterns can be defined manually or discovered by a context based pattern discovery method. The widgets facilitate modification of data attributes (e.g., changing a data value for the product name attribute in Product Entity Widget 30 according to an editable rule associated with this attribute and controlled by the widget).

An example embodiment is depicted in FIG. 4 schematically showing the generation of Product Entity Widget 30 by application of a common or generic rule set 32 to data 31 from a data source. The data 31 from the data source includes product attributes (e.g., a listing of different products for a grocery store inventory). Patterns of the data are determined to help establish which rules for the rule set 32 are to be applied to the widget.

In an example scenario, there may be a number of sets of rules applicable to data to be used by application App1 (20) of client 2 that are obtained from the data quality rules module 14. Assume that two rules (Rule 1 and Rule 2) are applicable to the Product Name attribute of Product Entity Widget 30. These two rules are grouped with this attribute and are accessible for selection and/or modification by the widget (e.g., by selecting the "Edit Rules" button for this widget).

Each rule pertaining to a widget is parameterized based upon the rule artifacts (step 120). In particular, parameters are selected for the different rule artifacts, where a parameter defines an action to be taken based upon a satisfied condition of a rule artifact (e.g., if a condition is met, then a particular parameter is applied to data associated with the widget). The parameterization of rules by a widget can include the addition of a new rule, the modification of an existing rule and/or the deletion of an existing rule.

After entity widgets have been generated for a particular application, the "Edit Rules" function of a widget can be utilized to modify each common set of rules to a new customized or adapted set of rules based upon application or user specifications.

Figure 5:
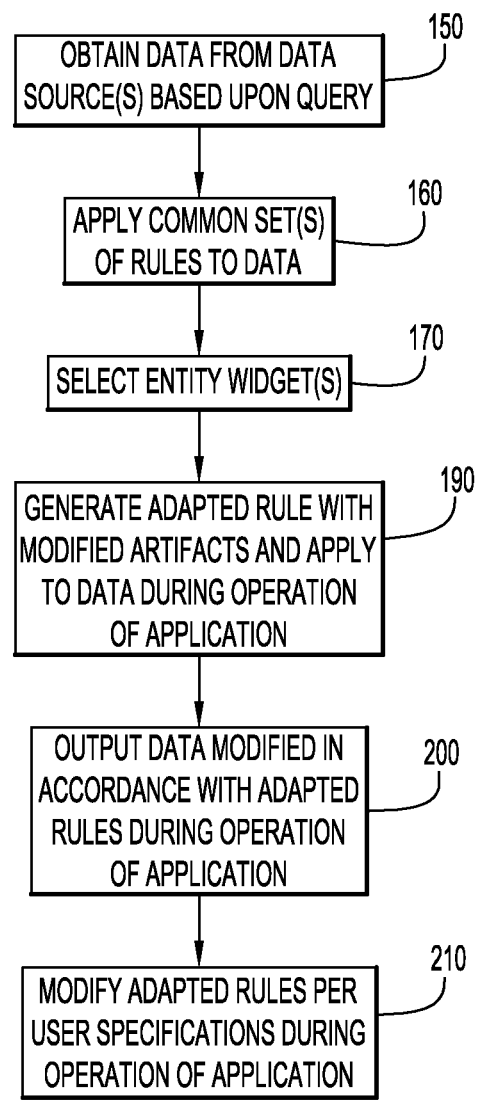
FIG. 5 is a flow diagram illustrating operation of the system of FIG. 1, including the manner in which a widget is customized to adapt a set of generic data quality rules for use with a client application according to an example embodiment of the present invention.

An example embodiment of operation of the system of FIG. 1, including customization or adaptation of a set of rules (using an entity widget such as widget 30), is now described with reference to the flowchart of FIG. 5. In this process, entity widgets (such as entity widget 30, e.g., stored in widget module 22 of client 2) have been generated according to the process depicted in FIG. 3. A query by client 2 results in data records being obtained from one or more of the data sources 6, 8, 10 (step 150). One or more common sets of rules from the data quality rules module 14 of the data quality rules database 12 are applied to the data records (step 160). These common rules are the same and thus apply the same types of modifications to the same or similar data (e.g., data within the same table columns or the same or similar data records) obtained from data sources 6, 8, 10 regardless of which client or which client application is making the query. The decision regarding which rules to apply from the data quality rules module 14 can be determined, e.g., based upon the data attributes (e.g., different data columns from selected data tables may be associated with one or more specific sets of common rules). Application of the set(s) of common or generic rules to the data obtained from the data sources can be performed by the data quality rules database 12 or, alternatively, by the client 2.

One or more entity widgets are selected from the widget module 22 of the client 2 (step 170). The "Edit Rules" feature of the widget is accessed by a user to generate adapted rules with modified artifacts applied to data during operation of a client application, such as APP1 (step 190). In other words, the "Edit Rules" feature of the widget allows a user to selectively modify the common set(s) of rules applied to the data. The data which has been modified based upon the adapted rules being applied by one or more entity widgets is output by the client application (e.g., in a graphical display) (step 200). In addition, the adapted rules can further be modified during operation of the application (step 210) by selecting the "Edit Rules" feature for any of the widgets by the user at any time during operation of the application. For example, if a user wishes to change the display of a particular data attribute, the "Edit Rules" feature of a suitable widget can be selected by the user to make such a change, thus allowing for changes to be made during operation of the client application.

An example embodiment depicting a GUI interface 35 showing the "Edit Rules" feature for a widget, Product Entity Widget 30, is described with reference to FIG. 6. This example embodiment shows how the rules for the Quantity attribute can be adjusted based upon client application and/or user specifications. An example record "12OZ FIZZY CORP CHEESE CAN" is shown in which the widget modifies the data quality rules to convert the quantity unit of measure (for this particular record, the unit of measure is modified from "OZ" to "OUNCES" for output or display) for this data record and/or each data record associated with the Product Entity Widget 30. Thus, the widget modifies the data quality rules such that an output or display of this record (and other selected records having product quantity information) has a revised quantity value. Other modifications can also be set or adjusted for the other attributes associated with this type of product record (e.g., modifications to data associated with product name, brand name and type). In addition, other entity widgets can be accessed to selectively edit rules associated with the widgets. Such adjustments or modifications to the widgets can further be performed during operation of the client application (e.g., applied "on the fly" or during runtime of the application).

The system of FIG. 1 is configured such that the source system or data quality rules database 12 can provide the common set or sets of pre-defined rules to each client (e.g., client 2 and client 4), where each client modifies or adapts the rules, utilizing the widgets stored within the widget module of the client. The rules are adapted based upon the particular requirements of the client or the requirements of the specified application for each client. Thus, both client 2 and client 4 may receive the same common set of rules stored with the data quality rules module 14 of database 12. However, each client may modify and thus customize the rules to the client's own specifications (e.g., based upon the different requirements for the different client applications APP1 or APP2) such that the adapted or modified set of data quality rules for client 2 is different from the adapted or modified set of data quality rules for client 4.

Thus, the invention embodiments facilitate modification and adaptation of a common or generic set of rules that are applied to data based upon a particular application or user specification. This differs from typical systems in which data quality rules are applied by a source system, and to change or customize the data quality rules can be a lengthy and complicated process (e.g., requiring a change in the code that applies the rules). In the present invention embodiments, a common/generic set of rules are applied to data obtained from data sources (e.g., at the data quality rules database and/or by a particular client), while modifications to the data quality rules can be performed individually by a particular client using one or more widgets. The widgets can include all information for a particular entity, including metadata for data associated with the entity, the common set or sets of rules to be applied to data associated with the entity, and customization features for such rules. Entity widgets can be generated by determination of data patterns and rules associated with data in patterns.

It will be appreciated that the embodiments described above and illustrated in the drawings represent only a few of the many ways of implementing embodiments for adapting data quality rules to be applied to data based upon the requirements of an application and/or user specifications or preferences.

The topology or environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., IBM-compatible, laptop, PDA, mobile devices, etc.), and may include any commercially available operating system and any commercially available or custom software (e.g., browser software, communications software, server software, cleansing and data quality analysis software, etc.). These systems may include any types of monitors and input devices (e.g., keyboard, mouse, voice recognition, etc.) to enter and/or view information.

It is to be understood that the software (e.g., the data mart, gap report module, rule template module, instantiated rule module, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow diagrams may be modified in any manner that accomplishes the functions described herein. In addition, the functions in the flow diagrams or description may be performed in any order that accomplishes a desired operation.

The software of the present invention embodiments may be available on a recordable medium (e.g., magnetic or optical mediums, magneto-optic mediums, floppy diskettes, CD-ROM, DVD, memory devices, etc.) for use on standalone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database structures may be implemented by any number of any conventional or other databases, data stores or storage structures (e.g., files, databases, data structures, data or other repositories, etc.) to store information. The databases and/or other storage structures may be remote from or local to the computer or other processing systems, and may store any desired data.

Present invention embodiments may be utilized for analyzing the data of any types (e.g., boolean, character, alphanumeric, symbols, etc.) representing any information. Further, present invention embodiments may be utilized for analyzing data from any types of storage units, systems or devices (e.g., databases, files, memory devices, data structures, processing devices, various types of stationary or mobile computer or processing systems or devices, etc.). The data analyzed from one or more data sets may be of any size, and include any type of data and metadata.

The present invention embodiments may employ any number of any type of user interface (e.g., Graphical User Interface (GUI), command-line, prompt, etc.) for obtaining or providing information (e.g., obtaining information for the desired analysis to be performed, providing charts or other data visualizations, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be utilized for analyzing and generating visualizations of data from any data source for any type of process.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed:

1. A system for applying data quality rules to a data set obtained from at least one data source, the system comprising:

a source system to retrieve data from the at least one data source along with a common set of rules configured to format and output the retrieved data in a manner in accordance with one or more predefined data quality rules of the common set of rules; and a client comprising at least one processor configured with logic to:

query the retrieved data from the source system;

receive the retrieved data along with the common set of rules from the source system, wherein the client includes a widget module comprising at least one editable widget including one or more control elements to facilitate adapting the common set of rules to be applied to the received data in accordance with an application of the client;

select the at least one editable widget from the widget module;

modify the common set of rules using the at least one editable widget in accordance with a specified application of the client during operation of the specified application to form a modified set of data quality rules such that an output of an element of the received data has a revised form with respect to output in accordance with the common set of rules, wherein the modification is specific to the specified application of the client; and apply the modified set of data quality rules to the retrieved data such that the retrieved data is output in accordance with the modified set of data quality rules by the specified application, wherein the client is further configured with logic to generate a widget by selecting attributes from data tables of the at least one data source and grouping the selected attributes with the widget, and wherein each editable widget comprises a first graphical user interface listing attributes associated with the widget and at least one additional graphical user interface comprising at least one editable field that facilitates modification of a predefined data quality rule.

2. The system of claim 1, wherein each widget is associated with an entity that defines a category of data records, and the client is configured with logic to apply the modified set of data quality rules to records or columns of the retrieved data.

3. The system of claim 1, wherein the client is further configured with logic to edit the modified set of data quality rules for at least one widget during operation of the specified application by the client.

4. The system of claim 1, wherein each editable widget facilitates modification of a predefined data quality rule applied to one attribute associated with the widget separately from another attribute associated with the widget.

5. The system of claim 1, wherein the source system provides data retrieved from the at least one data source and the common set of rules to a plurality of clients.

6. A computer program product for applying data quality rules to a data set obtained from at least one data source, the computer program product comprising:

a computer readable storage medium having computer readable program code embodied therewith, the computer readable program code configured to:

query data from the at least one data source;

receive the data retrieved from the at least one data source along with a common set of rules configured to format and output the retrieved data in a manner in accordance with one or more predefined data quality rules of the common set of rules;

select at least one editable widget from a widget module;

modify the common set of rules using the at least one editable widget in accordance with a specified application during operation of the specified application to form a modified set of data quality rules such that an output of an element of the received data has a revised form with respect to output in accordance with the common set of rules, wherein the modification of the one or more predefined data quality rules is specific to the specified application, and the at least one editable widget includes one or more control elements to facilitate adapting the common set of rules to be applied to the received data in accordance with the specified application; and apply the modified set of data quality rules to the retrieved data such that the retrieved data is output in accordance with the modified set of data quality rules by the specified application, wherein the computer readable program code is configured to generate a widget by selecting attributes from data tables of the at least one data source and grouping the selected attributes with the widget, and wherein each editable widget comprises a first graphical user interface listing attributes associated with the widget and at least one additional graphical user interface comprising at least one editable field that facilitates modification of a predefined data quality rule.

7. The computer program product of claim 6, wherein each widget is associated with an entity that defines a category of data records, and the modified set of data quality rules is applied by the computer readable program code to records or columns of the retrieved data.

8. The computer program product of claim 6, wherein the computer readable program code is configured to edit the modified set of data quality rules for at least one widget during operation of the specified application.

9. The computer program product of claim 6, wherein each editable widget facilitates modification of a predefined data quality rule applied to one attribute associated with the widget separately from another attribute associated with the widget.

\* \* \* \* \*